United States Patent [19]
Ellsworth

[11] 3,942,504
[45] Mar. 9, 1976

[54] FUEL FLOW SHUT-OFF VALVE
[75] Inventor: Eric D. Ellsworth, Allen Park, Mich.
[73] Assignee: Ford Motor Company, Dearborn, Mich.
[22] Filed: Dec. 16, 1974
[21] Appl. No.: 533,371

[52] U.S. Cl.............. 123/198 DB; 137/38; 180/104
[51] Int. Cl.².......................................... F16K 17/36
[58] Field of Search.......... 123/198 DB; 137/38, 43; 180/104

[56] References Cited
UNITED STATES PATENTS
2,619,185  11/1952  Rudisill.............................. 137/38 X
3,807,423  4/1974  Engel..................................... 137/38

Primary Examiner—Robert G. Nilson
Attorney, Agent, or Firm—Robert E. McCollum; Keith L. Zerschling

[57] ABSTRACT

A fuel line for a motor vehicle engine contains a fuel flow shut-off device having a number of valves which upon lateral rollover of the vehicle and engine move to shut off fuel flow through the line, regardless of the direction of rollover.

7 Claims, 11 Drawing Figures

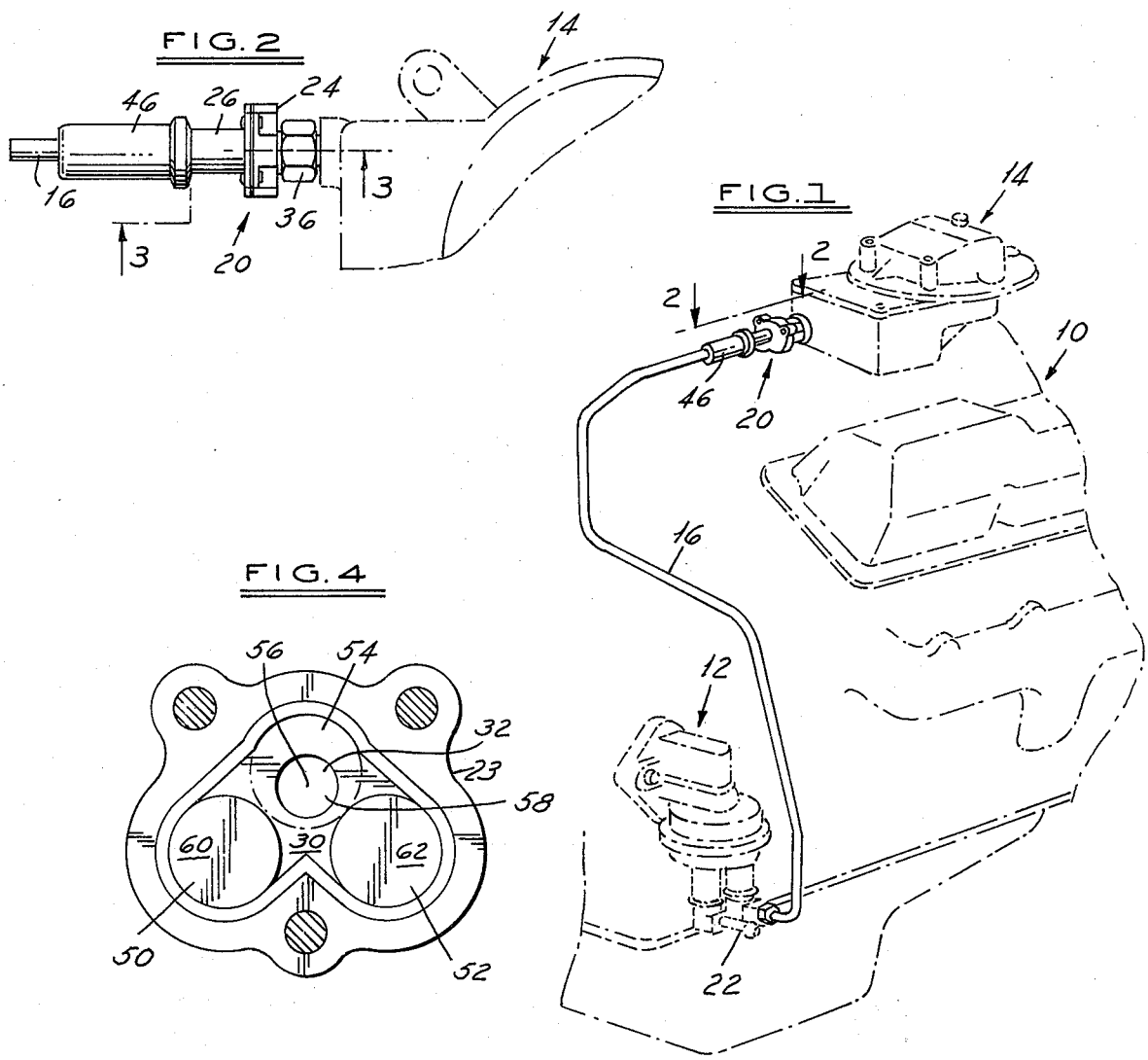
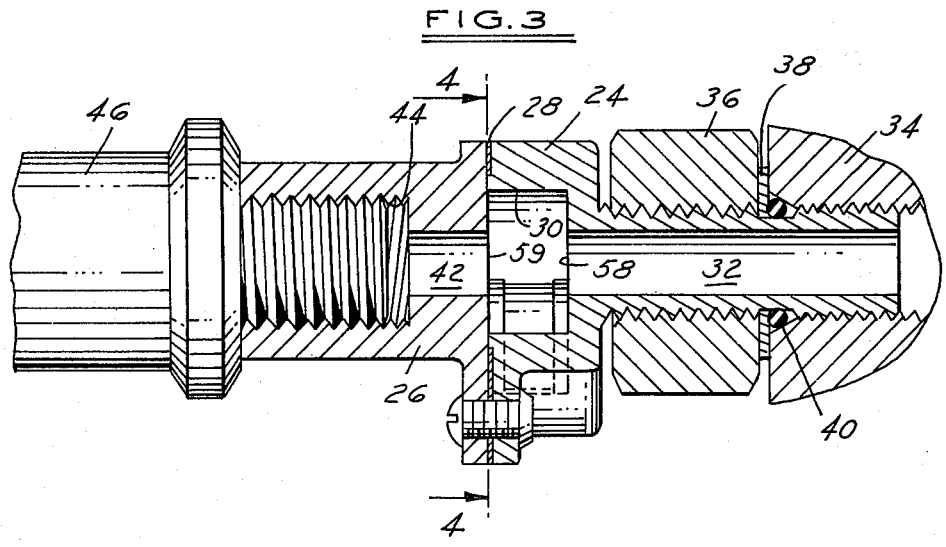

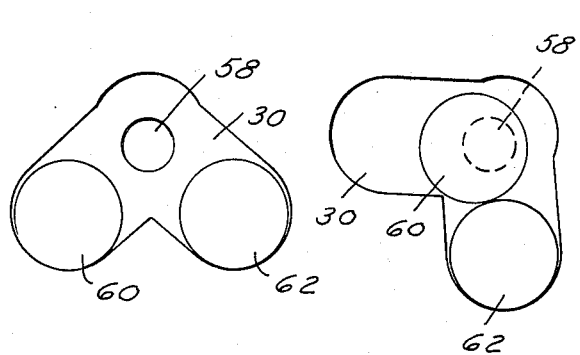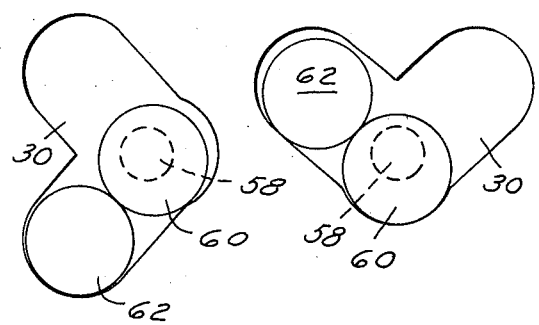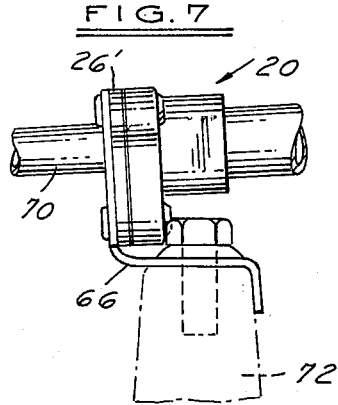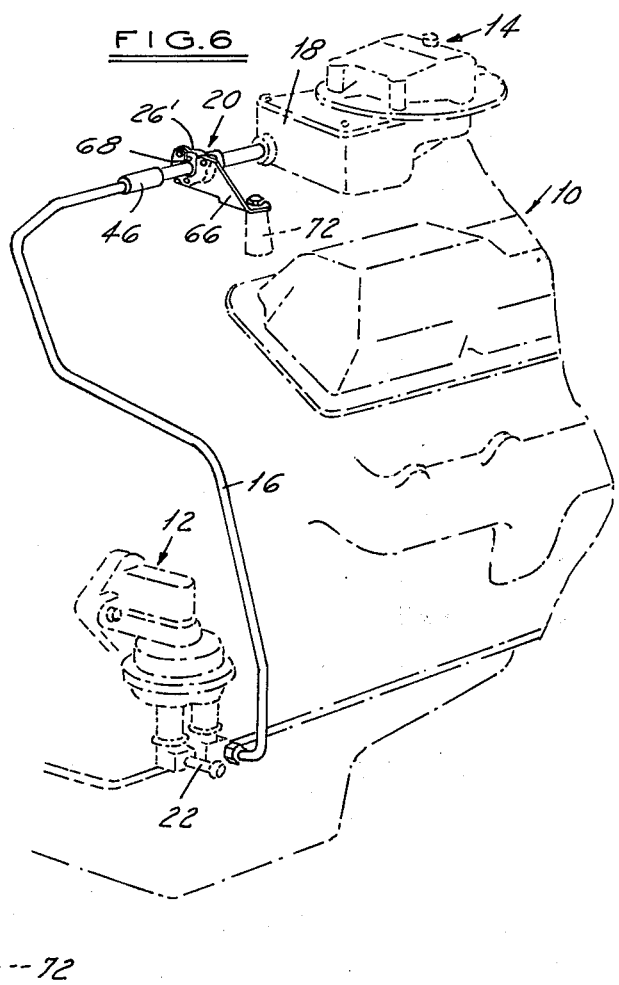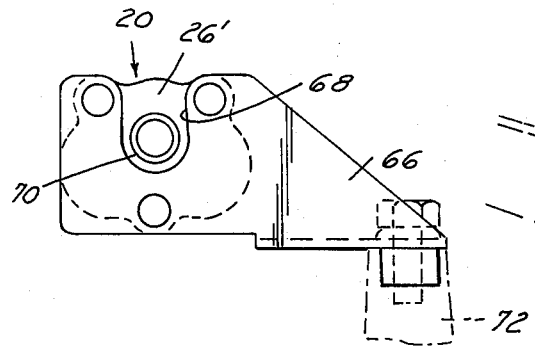

FUEL FLOW SHUT-OFF VALVE

This invention relates in general to a fuel flow shut-off valve. More particularly, it relates to a device that will automatically shut off or block the flow of fuel in an engine fuel line when the motor vehicle rolls over or otherwise attains an attitude in which fuel normally would escape from the system.

Devices are known to prevent the spill of fuel from an engine when a motor vehicle is involved in an accident causing it to turn over or tip sufficient to lose fuel. An example is shown in U.S. Pat. No. 2,619,185, Rudisill, issued Nov. 25, 1952, "Safety Fuel Cut-off for Vehicles." Rudisill shows a line connecting a fuel tank to an engine carburetor. The line contains a triangularly-shaped extension in which are located three gravity movable valve members. The valve members are conically-shaped to cooperate with tapered portions of the line extensions so that as soon as the vehicle rolls beyond a predetermined angle in either direction, at least one of the valve members will seat to seal off flow through the line.

The above construction requires three separate valves and three separate mating line portions to assure blocking of fuel flow in all attitudes of the line other than upright. This results in an expensive construction.

The invention provides an economical engine fuel flow control device that positively shuts off fuel flow when desired, and yet has a minimum number of valves and a simplified construction. More particularly, the invention consists of a hollow housing that is disposed in the fuel line at right angles to the direction of fuel flow and contains a number of valve means that move between alternate positions individually blocking or unblocking the fuel line as a function of the direction of tilting movement of the housing upon rollover of the vehicle.

It is a primary object of the invention, therefore, to provide a fuel flow control device that is simple in construction, has a minimum of parts, is economical to manufacture, and is reliable in operation.

It is a further object of the invention to provide a fuel flow control device that has a housing containing a number of rollable valve means that move selectively upon tilting of the housing in response to rollover of the vehicle to alternately and selectively block flow through a fuel line so long as the housing and vehicle remain other than in the upright position.

It is a still further object of the invention to provide a control device of the type described which includes a flat hollow housing extending on end in an upright position essentially at right angles to the direction of fuel flow through the line in which it is inserted, the housing having a chamber with an inverted heart-like shape in its normal installed position, the lower angularly-extending portions of the housing each containing a disc valve that is guided by the shape of the housing to be rollable selectively as a function of the direction of angular tilting movement of the housing upon rollover of the vehicle, into the upper apex portion of the chamber containing fuel inlet and outlet ports so as to block flow through the line at all positions of the housing other than in the upright position.

Other objects, features and advantages of the invention will become more apparent upon reference to the succeeding detailed description thereof, and to the drawings illustrating the preferred embodiment thereof; wherein, FIG. 1 is a perspective elevational view of an internal combustion engine embodying the invention;

FIG. 2 is an enlarged portion of a detail taken on a plane indicated by and viewed in the direction of the arrows 2—2 of FIG. 1;

FIG. 3 is an enlarged cross-sectional view taken on a plane indicated by and viewed in the direction of the arrows 3—3 of FIG. 2;

FIG. 4 is a cross-sectional view taken on a plane indicated by and viewed in the direction of the arrows 4—4 of FIG. 3;

FIGS. 5a, 5b, 5c and 5d are schematic illustrations of the device shown in FIG. 4 and illustrating the disc valves of the invention in various operative positions they attain upon an angular tilting of the housing forming a part of the invention;

FIG. 6 is a perspective view corresponding to that shown in FIG. 1 and illustrating another embodiment of the invention; and, FIGS. 7 and 8 are enlarged side and end elevational views of a detail shown in FIG. 6.

FIG. 1 illustrates a portion of a V-type internal combustion engine 10 having a fuel pump 12 and a downdraft type carburetor 14. A fuel supply line 16 connects the fuel pump and the float bowl 18 of the carburetor, and contains the fuel flow shut off device 20 of the invention. The fuel pump 12 in this case has an inlet fitting 22 that is adapted to be connected to a gasoline tank or fuel reservoir, not shown. As will appear later, it will be clear that the fuel shut off device may be installed in any fuel or fuel vapor line associated with the engine to minimize fuel spill upon rollover of the vehicle, without departing from the scope of the invention.

As best seen in FIGS. 2, 3 and 4, device 20 has an upright box-like housing 23 that consists of two cast parts, 24 and 26 riveted together, with a sealing gasket 28 between. The right hand portion 24, as seen in FIG. 3, is cup-shaped to define a valve chamber 30 that is intersected at right angles by an axial fuel passage 32. The portion defining the fuel passage 32 is externally threaded for mounting directly to a portion 34 of the carburetor body, by means of a lock nut 36 and a washer 38 compressing an O-ring type seal 40.

The mating housing portion 26 has fuel passage 42 that is axially aligned with passage 32. Passage 42 joins chamber 30 to a threaded recess 44 into which can be inserted one end of a conventional fuel filter 46. The opposite end of the fuel filter, as seen in FIG. 1, is connected to fuel line 16.

As best seen in FIG. 4, chamber 30 has a clover-like or inverted heart-like shape in cross section, with three nodes or finger like parts 50, 52 and 54 interconnected but at angles to each other. The axes of fuel flow passages 32 and 42 are coincident with the axis 56 of the upper node 54. This also, of course, makes it coincident with the axis of ports 58 and 59 defined by the intersection of chamber 30 with fuel passages 32 and 42. Each of the lower angularly extending nodular portions 50 and 52 contains a flat disc valve 60, 62 that at times is adapted to roll by gravity into and out of the position shown from and towards the apex or nodular portion 54. The depth of chamber 30 and the width of each finger portion is made just slightly greater than the thickness and diameter respectively of the rollable discs contained within the chamber so that the flatness and shape of the housing walls serve to guide the movement of the discs.

When the fuel shut off device 20 is installed in line 16, it is located at the attitude indicated in FIGS. 1 and 4, which is referred to as the upright position. Thereafter, so long as the motor vehicle remains in a normal essentially upright position, the discs 60 and 62 remain in the positions shown in FIGS. 4 and 5a, permitting the free flow of fuel through the ports 58 and 59. However, as soon as the vehicle tilts a predetermined amount laterally about its longitudinal axis, i.e., the axis parallel to the axis of the fuel flow through ports 58 and 59, by an angle sufficient to tilt the housing clockwise from the FIG. 5a position, for example, to the FIG. 5b position, then disc 60 will roll by gravity progressively to the positions shown in FIGS. 5b, 5c and 5d covering the ports 58 and 59. This will prevent further flow of fuel through line 16 into the carburetor and thereby minimize spillage. The pressure of fuel against the side face or surface of the disc will then aid in sealing the disc against one of the ports, depending upon the direction of fuel pressure application. Continued clockwise movement of the housing by continued rollover of the vehicle, will maintain disc 60 in the position blocking fuel flow until the vehicle makes essentially a complete turn of 360° returning it and the housing again to the position shown in FIG. 5a. At this point, the disc 60 will have rolled back by gravity into the nodular portion 50 and unblock the fuel ports 58 and 59.

A similar action occurs should the vehicle roll over or back in the opposite or counterclockwise direction. In this latter case, the disc 62 rather than disc 60 would move to cover the fuel ports 58 and 59, in a manner similar to that shown in FIGS. 5a through 5d, inclusive, but in the reverse direction. It will be seen, therefore, that regardless of the direction of tilting movement of the vehicle about a longitudinal axis, one or the other of the discs 60, 62 will move into the nodular portion 54 to block flow through the ports 58 and 59.

It will be seen, therefore, that the housing of device 20 rotates about the axis 56 of that portion of the fuel line in which it is installed, and by the major portion of the housing extending laterally essentially at right angles to the direction of fuel flow, the discs 50 or 52 can roll selectively as a function of the direction of tilting movement to cover the fuel ports 58 and 59 during all attitudes of the housing other than the normal upright position.

FIGS. 6, 7 and 8 show an alternate method of mounting control device 20 on a part of the engine instead of to the carburetor. More particularly, in this case, one end of a right angle bracket 66 is riveted to the housing portion 26', with a cutout 68 to accommodate a fuel line adapter 70. The adapter is connected or inserted in the adjacent end of a flexible neoprene line connected to the fuel filter. The opposite end of bracket 66 is bolted to a stud 72 on the engine, as seen in FIG. 6.

The operation of the FIG. 6–8 modification is the same as that described in connection with FIGS. 1, 2 and 5, and, therefore, is not repeated.

From the foregoing, it will be seen that the invention provides a fuel flow shut off valve that in its normally installed or assembled position extends upright essentially at right angles to the direction of fuel flow through the line at that point; that the housing consists of a pair of flat parallel members with a connecting wall to define a chamber, the chamber being formed with an upstanding and a pair of depending finger-like portions extending at angles to each other and spaced circumferentially from each other; that the chamber contains a number of disc valves one less than the number of finger or nodular portions, that are selectively and individually rollable into a position to block flow of fuel past the valve when the housing and the vehicle in which it is installed attains a predetermined angular tilted attitude away from its normal upright position; the line remaining blocked until the vehicle and housing return to the upright position. It will also be seen that regardless of the direction of angular tilting, at least one of the valve members will cover and block the fuel line at all times other than when the shutoff device is in an upright normal position.

While the invention has been shown and described in its preferred embodiments, it will be clear to those skilled in the arts to which it pertains that many changes and modifications may be made thereto without departing from the scope of the invention. It will be clear, for example, that the circumferential or angular spacing between the nodular or finger-like portions 50, 52 and 54, as seen in FIG. 4, can be varied as desired to vary the amount of tilt permitted before fuel flow shut off is attained, to avoid shut off during certain vehicle cornering movements, for instance.

I claim:

1. A fuel flow control device for use in connection with a motor vehicle engine having a fuel containing line connecting a fuel source to a portion of the engine induction system, the device comprising a housing secured in the line in an upright position connecting two parts of the line and extending essentially at right angles to the direction of fuel flow through the line at that point, the housing having a fuel inlet port axially aligned with a fuel outlet port in the direction of fuel flow, and valve means in the housing movable across at least one of the ports to block flow through the line in response to a predetermined tilting angular movement of the housing in either direction from the upright position upon a corresponding tilting of the engine about its longitudinal axis, said housing having a clover-like shape with a plurality of nodes extending at angles to each other, the ports being located in one of the nodes, the valve means being located in the remaining of the plurality of nodes and movable therefrom into the one node, the valve means comprising a number of valves greater than one and one less than than the number of nodes.

2. A control device as in claim 1, the valve means comprising a plurality of discs each rollable separately across the one port at times and alternating with the remaining of the plurality of discs as a function of the tilting movement of the housing to maintain the one port blocked at all times when the housing is in a position other than the upright position.

3. A fuel flow control device for use in connection with a motor vehicle engine having a fuel containing line connecting a fuel source to a portion of the engine induction system, the device comprising a housing secured in the line in an upright position connecting two parts of the line and extending essentially at right angles to the direction of fuel flow through the line at that point, the housing having a fuel inlet port axially aligned with a fuel outlet port in the direction of fuel flow, and valve means in the housing movable across at least one of the ports to block flow through the line in response to a predetermined tilting angular movement of the housing in either direction from the upright position upon a corresponding tilting of the engine about its longitudinal axis, the housing having a cloverlike shape with an upstanding node and a plurality of depending nodes each spaced angularly from the upstanding node and from each other, the ports being located in the upstanding node, each of the depending nodes containing a valve rollable by gravity toward the upstanding node to block flow through the one port upon tilting movement of the housing from the upright position.

4. A control device as in claim 3, the housing being flat and the valves consisting of flat discs.

5. A control device as in claim 3, the housing being rotatable about the coincidental axes of the upstanding node and the fuel flow.

6. A fuel flow control device for use in connection with a motor vehicle engine having a fuel containing line connecting a fuel source to a portion of the engine induction system, the device comprising a housing secured in the line in an upright position connecting two parts of the line and extending essentially at right angles to the direction of fuel flow through the line at that point, the housing having a fuel inlet port axially aligned with a fuel outlet port in the direction of fuel flow, and valve means in the housing movable across at least one of the ports to block flow through the line in response to a predetermined tilting angular movement of the housing in either direction from the upright position upon a corresponding tilting of the engine about its longitudinal axis, the housing consisting of a pair of flat parallel members with a connecting wall, the housing having an inverted heart-like shape when in the installed upright position with an upper apex portion and two lower angled portions, the ports being located in aligned portions of the members in the upper apex portion, the lower portions each containing a flat disc valve separately and selectively rollable towards the ports to block at least one of the same upon a predetermined angular tilting movement of the housing in either direction from the upright position.

7. A fuel flow control device for use in connection with a motor vehicle engine having a fuel containing line connecting a fuel source to a portion of the engine induction system, the device comprising a housing secured in the line in an upright position connecting two parts of the line and extending essentially at right angles to the direction of fuel flow through the line at that point, the housing having a fuel inlet port axially aligned with a fuel outlet port in the direction of fuel flow, and valve means in the housing movable across at least one of the ports to block flow through the line in response to a predetermined tilting angular movement of the housing in either direction from the upright position upon a corresponding tilting of the engine about its longitudinal axis, wherein the valve means includes a pair of flat discs alternately rollable by gravity to a position across the one port as a function of the direction of angular tilting movement of the housing from the upright position.

* * * * *